United States Patent [19]

Redhead

[11] 4,177,721
[45] Dec. 11, 1979

[54] BARBECUE ROTISSERIE BASTER

[76] Inventor: Walden K. Redhead, 3831 E. McGilvra St., Seattle, Wash. 98112

[21] Appl. No.: 874,322

[22] Filed: Feb. 1, 1978

[51] Int. Cl.² .......................................... A47J 37/04
[52] U.S. Cl. .................................. 99/345; 99/421 H
[58] Field of Search ............ 99/345, 346, 347, 421 R, 99/421 H, 494, 516, 534, 535, 536; 426/302, 523; 222/167, 169, 485, 565

[56] References Cited

U.S. PATENT DOCUMENTS

| 358,968 | 3/1887 | Dugard | 99/345 |
|---|---|---|---|
| 399,561 | 3/1889 | Rich | 99/346 |
| 809,851 | 1/1906 | Scott | 99/346 |
| 2,182,225 | 12/1939 | Garvis | 99/346 |
| 2,813,478 | 11/1957 | Popple | 99/346 |
| 3,022,721 | 2/1962 | Vath | 99/345 |
| 3,224,362 | 12/1965 | Kozar | 99/346 |
| 3,339,480 | 9/1967 | Raman | 99/345 |
| 3,529,536 | 9/1970 | Milhem | 99/346 |
| 3,762,307 | 10/1973 | Badovinac | 99/345 |
| 4,061,083 | 12/1977 | Caliva | 99/345 |

FOREIGN PATENT DOCUMENTS

| 3705 of 1902 | United Kingdom | 99/345 |
|---|---|---|
| 721331 1/1955 | United Kingdom | 99/345 |

Primary Examiner—Billy J. Wilhite
Attorney, Agent, or Firm—Victor J. Evans & Co.

[57] ABSTRACT

Disclosed herein is an automatic baster for use with a barbecue rotisserie which can be characterized in that the basting apparatus includes at least one basting dispenser fastened to the meat to be cooked and rotating therewith so that the meat will be given a cyclic periodic quantum of basting material throughout the cooking cycle. The basting apparatus in one preferred form comprises a cylinder having means to mount the cylinder upon the meat and orifices whose dimensions are adjustable to regulate the basting dispensing rate (along with the viscosity of the basting substance) so as to provide accurate control of the quantity of basting material dispensed on the meat.

5 Claims, 12 Drawing Figures

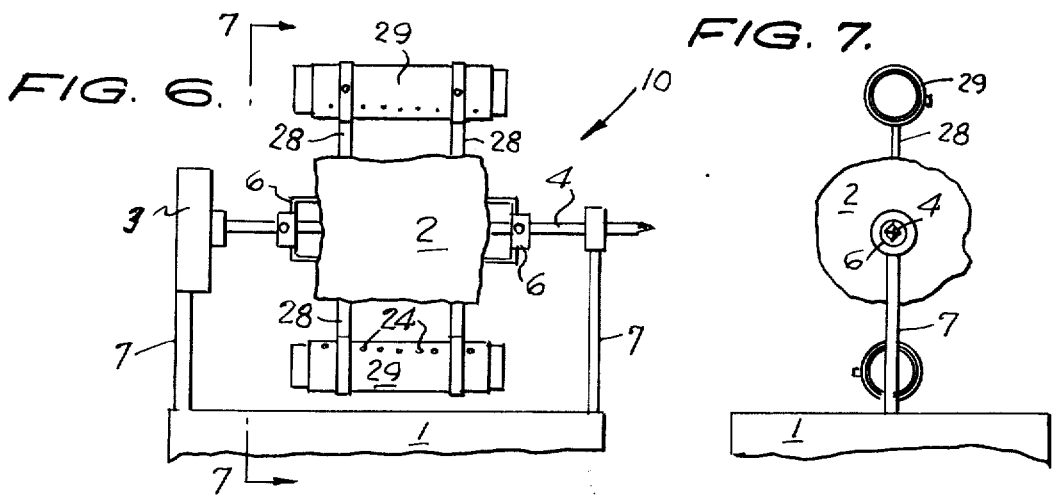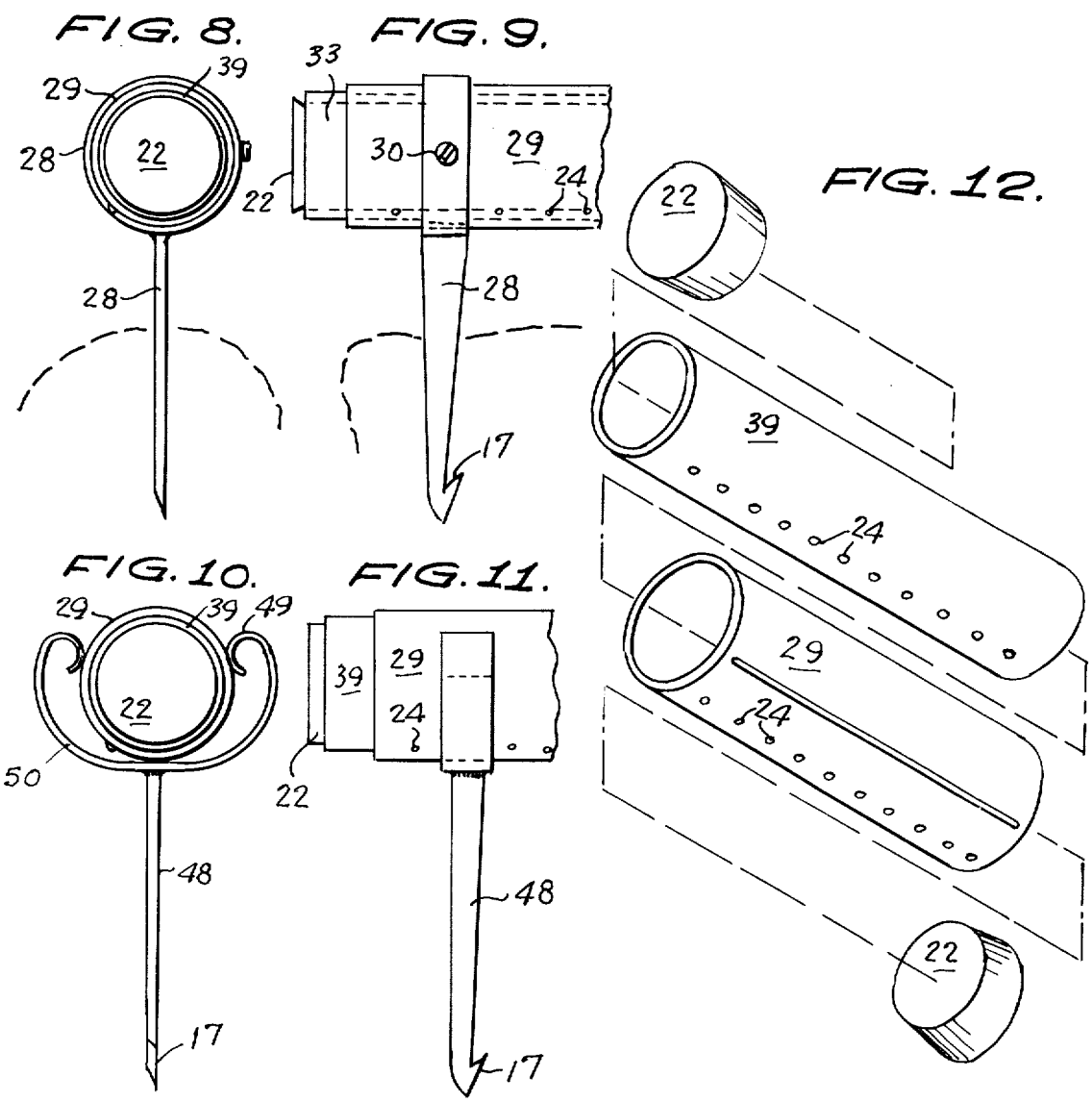

BARBECUE ROTISSERIE BASTER

BACKGROUND OF THE INVENTION

The concept of basting on a rotisserie has existed for some time. Patents of which applicant is aware of include the following: U.S. Pat. Nos. 730,525 Edgar, 1,337,122 Doak, 1,740,729 Garvis, 1,874,791 Murff, 2,182,225 Garvis, 2,813,478 Popple, 3,022,721 Vath, 3,244,362 Kozar. These patents can be characterized by noting that the basting apparatus is stationary relative to the rotating meat and consequently the resulting overhead structure which is to address the meat is of somewhat more complex configuration then the apparatus according to the instant invention. In addition however, the barbecue dispensers according to the prior art do not provide the simple construction and therefore the correct price range and do not provide an easy mechanism for cleaning the basting reservoirs or alternatively replacing them entirely with pre-packaged canisters of basting sauce.

SUMMARY OF THE INVENTION

Accordingly the following specification and claims are directed to an improved barbecue rotisserie baster in which the basting elements are easily removeable from the rotisserie structure and are capable of removal for cleaning or replacement. In addition the structure associated with the baste canister retention devices provide an easier method and technique as well as the apparatus for orienting meat upon a barbecue rotisserie spit since the over hanging structure of the prior art has been eliminated.

Accordingly it is an object of this invention to provide an improved basting apparatus for use with a rotisserie in a barbecue which has a simplified mechanical structure.

Another object of this invention contemplates providing a baster in which the canisters are easily removeable for cleaning or replacement and replenishment.

Another object of this invention contemplates providing a baster in which the flow rate can be easily governed.

These and other objects will be made manifest when considering the following detailed specification and claims.

BRIEF DESCRIPTION OF THE DRAWINGS

FIG. 6 shows an alternative embodiment to that delineated in FIGS. 1 through 5;

FIG. 7 is a view taken along lines 7—7 of FIG. 6;

FIG. 8 is an end view of the canister according to the present invention, second embodiment;

FIG. 9 is a partial side view of the canister shown in FIG. 8;

FIG. 10 shows a third embodiment of the basting retention apparatus according to the present invention;

FIG. 11 is a partial side view thereof; and

FIG. 12 shows the assembly of the canister forming the basting reservoir according to the present invention.

DESCRIPTION OF THE PREFERRED EMBODIMENTS

Figure 1:
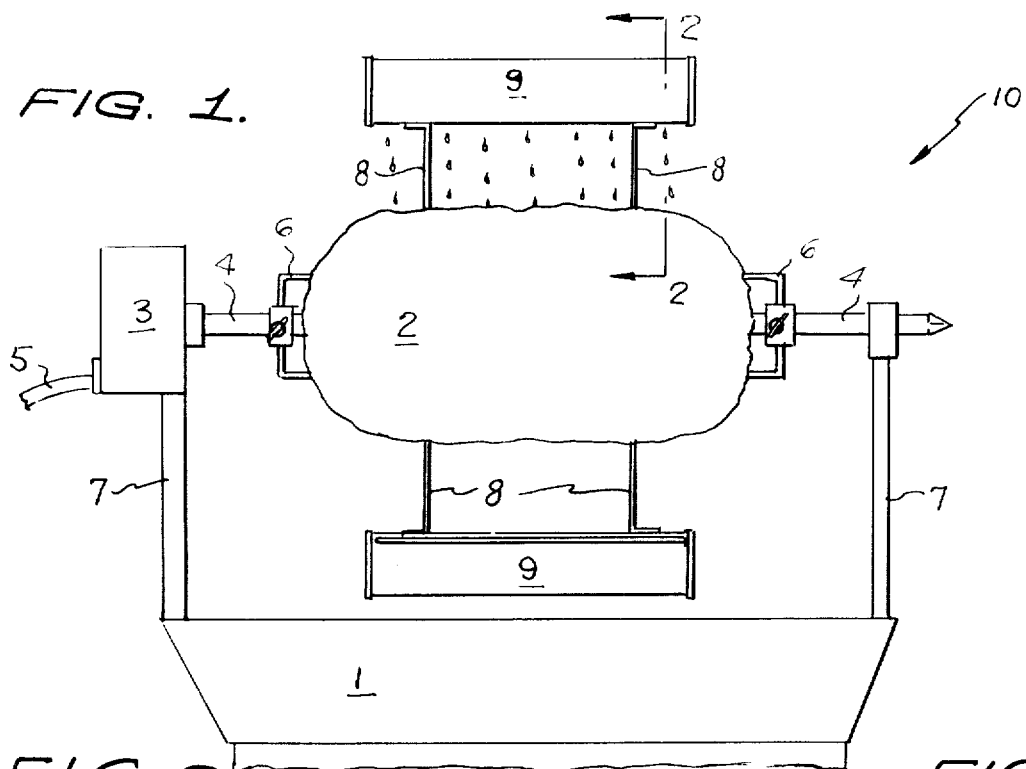
FIG. 1 shows one embodiment according to the present invention.
Figure 2:
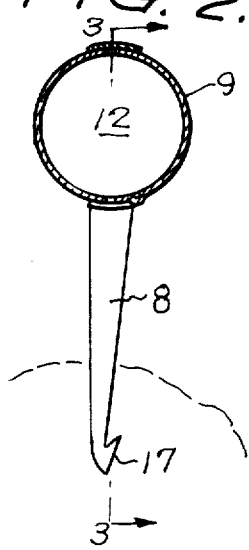
FIG. 2 is a sectional view taken along lines 2—2 of FIG. 1.

Referring to the drawings now wherein like reference numerals refer to like parts throughout the several drawings reference numeral 10 is generally directed to the barbecue rotisserie baster according to the present invention.

Figure 3:
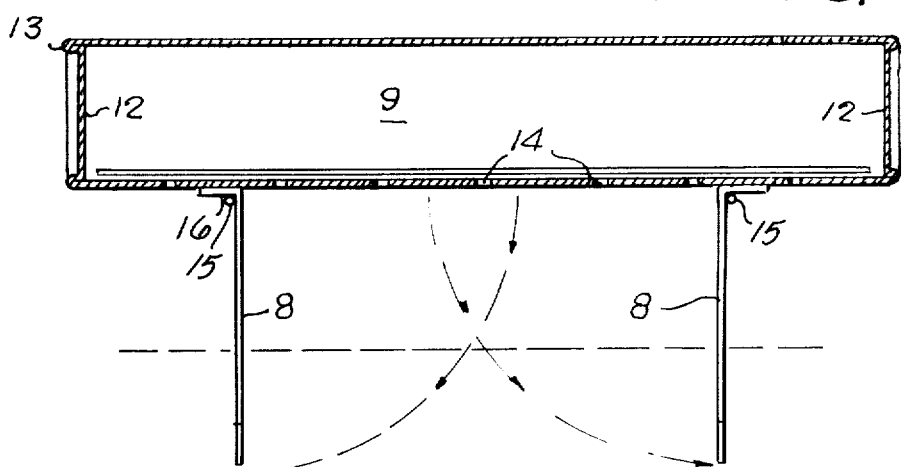
FIG. 3 is a sectional view taken along lines 3—3 of FIG. 2.
Figure 4:
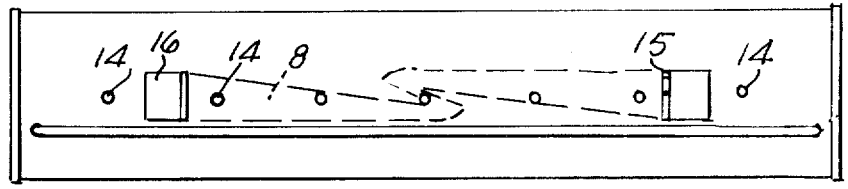
FIG. 4 is a view of the basting apparatus in its stored condition.
Figure 5:
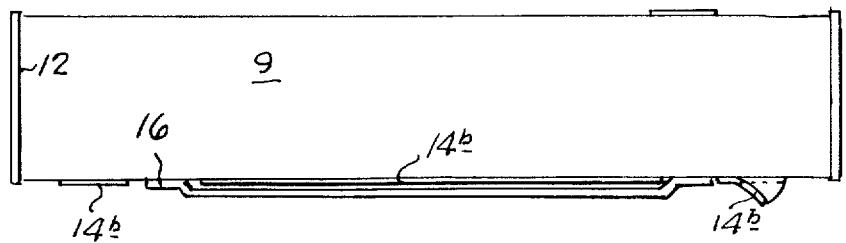
FIG. 5 is a side view of the basting canister shown in FIG. 4.

FIG. 1 generally shows a rotisserie apparatus comprising a tray 1 having upstanding columnar members 7 used to support a spit 4 having a motor drive 3 and a power cord 5 connected to a power source (not shown). The meat 2 is constrained on the spit 4 by means of grip members 6 as is well known in the art. The basting apparatus according to this embodiment comprises leg members 8 having hooked terminal portions 17 at one extremity and hinged members 15 articulating leg 8 about plate 16 which is fastened to the basting apparatus proper denoted by reference numeral 9. Reference numeral 9 generally shows a cylindrical tubelike structure in which the basting sauce is to be contained and is sealed therein by cap members 12 which coact against tube 9 through seal 13 on the outer flanged periphery of the cap 12. The bottom portion of the basting tube 9 best seen in FIG. 3 is provided with a plurality of apertures 14 which provides the slow and even distribution of the barbecue sauce. FIG. 4 shows a storage arrangement for the rotisserie baster in which the legs 8 are folded up and provide a substantially cylindrical appearance for the entire basting unit. In FIG. 5 there is shown a pull tab strip 14b which covers the holes 14 prior to use so that sauce does not leak out, and when used, the holes can be easily exposed by pulling tab 14b.

FIGS. 6 through 9 show an alternative embodiment according to the present invention in which leg members 28 are similarly provided with hook portions 17 at their ends remote from the basting cartridge 29 but in this case, rather than hinging legs 28 to the baster 29 a circular clip is caused to overlie the cartridge and be retained there by means of grub screw 30. The canister in this embodiment is also somewhat different and is best delineated in FIG. 12 although this embodiment is not limited to FIG. 9 but can also be used in FIG. 11 or in the first five figures. FIG. 12 of course shows the canister being comprised of an inner tube 39 having orifices 24 disposed linearly thereon in the longitudinal direction adapted to receive and engage an overlying tubular member 29 having similarly disposed holes 24. Cap members 22 seal the ends of the inner tube 39 and the noteworthy difference between this basting cartridge and that of the previous embodiment is that the holes can be varied in their aperture dimension by laterally shifting element 39 relative to element 29 so as to constrict the size of the holes and thereby control the flow rate, and also can serve to lengthen the baster for long meats by its telescoping action.

FIGS. 10 and 11 show an alternative embodiment for engaging the cartridge or reservoir shown in FIG. 12 and is generally defined by a leg portion 48 having a hook terminal portion 17 similar to the previous embodiments but terminates therefrom in a U-shaped member having inwardly and downwardly curved upper legs 49 to thereby define a resilient spring biased type of retention means for the cartridge. That is to say the U-shaped section 50 in cooperation with inwardly and downwardly turned hooked ends 49 constitute a resilient mechanism for holding the cartridge.

In operation therefore the hook portions 17 are inserted into the meat and the leg portions extend outwardly therefrom with the openings in the cartridge directed towards the meat when the cartridge is vertically above the meat so that when one cartridge is used once every three hundred and sixty degrees a quantum of barbecue sauce is dispensed on the meat.

Having thus described the invention it will become apparent that numerous structural modifications contemplated as being a part of this invention as specified hereinabove and as defined hereinbelow by the claims.

What is claimed is:

1. A barbecue rotisserie baster comprising in combination: a basting cartridge tube filled with basting sauce provided with control means for dispensing the sauce defined by a plurality of holes disposed substantially linearly longitudinally on said tube, leg elements having hooked end portions remote from said cartridge tube adapted to be inserted in an object to be basted, and means to fasten said leg elements to said cartridge tube comprising a loop section of suitable dimension to overlie said cartridge tube when said cartridge tube is slidably disposed therein and is provided with a screw means to constrain the cartridge within this loop, said loop is fastened to said leg elements.

2. A barbecue rotisserie baster comprising in combination: a basting cartridge tube filled with basting sauce provided with control means for dispensing the sauce defined by a plurality of holes disposed substantially linearly longitudinally on said tube, leg elements having hooked end portions remote from said cartridge tube adapted to be inserted in an object to be basted, and means to fasten said leg elements to said cartridge tube comprising a resilient U-shaped clip connected to said leg elements at the extremity remote from said hook portion, the resilient U-shaped portion terminating in an inwardly and downwardly disposed clip so as to constrain the cartridge disposed thereon.

3. A barbecue rotisserie baster comprising in combination: a basting cartridge tube filled with basting sauce provided with control means for dispensing the sauce defined by a plurality of holes disposed substantially linearly longitudinally on said tube, leg elements having hooked end portions remote from said cartridge tube adapted to be inserted in an object to be basted, and means to fasten said leg elements to said cartridge tube comprising a tab portion fixed to said tube and a hinged link connecting said tab portion to said leg elements so that said leg can pivot about said hinge.

4. A barbecue rotisserie baster comprising in combination: a basting cartridge tube filled with basting sauce provided with control means for dispensing the sauce defined by a plurality of holes disposed substantially linearly longitudinally on said tube, leg elements having hooked end portions remote from said cartridge tube adapted to be inserted in an object to be basted, and means to fasten said leg elements to said cartridge tube in which said cartridge tube comprises an inner tube having a plurality of orifices disposed in a linear longitudinal direction, an outer tube provided with similar orifices overlying said inner tube, and cap means fashioned to fit in and seal opposed extremities of said tubes.

5. The device of claim 1, 2, 3 or 4 in which said holes are covered by a pull tab prior to use.

* * * * *